(12) United States Patent
Kamiya et al.

(10) Patent No.: US 11,345,328 B2
(45) Date of Patent: May 31, 2022

(54) CONTROL DEVICE OF HYBRID VEHICLE

(71) Applicant: TOYOTA JIDOSHA KABUSHIKI KAISHA, Toyota (JP)

(72) Inventors: Kazuaki Kamiya, Toki (JP); Masatoshi Ito, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 246 days.

(21) Appl. No.: 16/681,917

(22) Filed: Nov. 13, 2019

(65) Prior Publication Data

US 2020/0164856 A1 May 28, 2020

(30) Foreign Application Priority Data

Nov. 22, 2018 (JP) .............................. JP2018-219449

(51) Int. Cl.
*B60W 20/10* (2016.01)
*B60W 10/06* (2006.01)
(Continued)

(52) U.S. Cl.
CPC ............... *B60W 20/10* (2013.01); *B60K 6/22* (2013.01); *B60L 1/003* (2013.01); *B60W 10/06* (2013.01);
(Continued)

(58) Field of Classification Search
CPC ...... B60W 20/10; B60W 10/06; B60W 10/08; B60W 10/30; B60W 2510/30;
(Continued)

(56) References Cited

U.S. PATENT DOCUMENTS

2013/0078111 A1   3/2013 Okamoto

FOREIGN PATENT DOCUMENTS

JP   2008-290576 A   12/2008
JP   2013-068267 A   4/2013
(Continued)

OTHER PUBLICATIONS

Y. Kim et al., "Development and Control of an Electric Oil Pump for Automatic Transmission-Based Hybrid Electric Vehicle," in IEEE Transactions on Vehicular Technology, vol. 60, No. 5, pp. 1981-1990, Jun. 2011, doi: 10.1109/TVT.2011.2140135.*

*Primary Examiner* — Brian P Sweeney
(74) *Attorney, Agent, or Firm* — Oblon, McClelland, Maier & Neustadt, L.L.P.

(57) ABSTRACT

In a control device of a hybrid vehicle including an engine, a rotating machine, a power transmission device, and an electric oil pump, the control device comprising: a state determining portion; an electric oil pump control portion performing a test operation of the electric oil pump for determining whether the electric oil pump operates normally when it is determined that the measured temperature of the oil allows the electric oil pump to operate normally; and an engine control portion, the electric oil pump control portion performs the test operation of the electric oil pump in a predetermined period after a power supply state of the hybrid vehicle is switched to a power-on state enabling the vehicle to run and before the hybrid vehicle actually starts running, and when the test operation of the electric oil pump is performed in the predetermined period, the engine control portion starts the engine.

4 Claims, 5 Drawing Sheets

(51) Int. Cl.
   *B60W 10/08*   (2006.01)
   *B60W 10/30*   (2006.01)
   *F04D 13/06*   (2006.01)
   *F04D 15/00*   (2006.01)
   *B60K 6/22*    (2007.10)
   *B60L 1/00*    (2006.01)

(52) U.S. Cl.
   CPC ............ *B60W 10/08* (2013.01); *B60W 10/30* (2013.01); *F04D 13/06* (2013.01); *F04D 15/0088* (2013.01); *B60W 2510/30* (2013.01); *B60W 2710/06* (2013.01); *B60W 2710/08* (2013.01); *B60W 2710/30* (2013.01); *B60Y 2200/92* (2013.01)

(58) Field of Classification Search
   CPC ......... B60W 2710/06; B60W 2710/08; B60W 2710/30; B60W 20/17; B60W 2050/022; B60W 20/50; B60W 10/10; B60W 20/00; B60W 2510/0657; B60W 2510/083; F04D 13/06; F04D 15/0088; B60L 1/003; B60L 2240/36; B60K 6/22; B60K 6/547; B60K 2006/4808; B60K 6/48; B60Y 2200/92; F16H 61/0031; Y02T 10/62
   See application file for complete search history.

(56) References Cited

FOREIGN PATENT DOCUMENTS

JP      2013068267 A  *  3/2014
JP      2017-150367 A    8/2017

* cited by examiner

FIG.5

CONTROL DEVICE OF HYBRID VEHICLE

This application claims priority from Japanese Patent Application No. 2018-219449 filed on Nov. 22, 2018, the disclosure of which is incorporated herein by reference in its entirety.

FIELD OF THE INVENTION

The present invention relates to a control device of a hybrid vehicle including an engine, a rotating machine for running, a power transmission device, and an electric oil pump.

DESCRIPTION OF THE RELATED ART

A control device of a hybrid vehicle including an electric oil pump rotated by a motor dedicated to the electric oil pump to discharge oil is well known. For example, this corresponds to a control device of an electric oil pump described in Patent Document 1. It is disclosed in Patent Document 1 that when a measured oil temperature of oil is determined as having a value resulting in an actual oil temperature at which an operation of the electric oil pump is assured as long as the electric oil pump is in a normal state, a failure determination for determining whether the electric oil pump operates normally is permitted so as to operate the electric oil pump, i.e., to perform a test operation of the electric oil pump.

PRIOR ART DOCUMENT

Patent Document

Patent Document 1: Japanese Laid-Open Patent Publication No. 2013-68267

SUMMARY OF THE INVENTION

Technical Problem

There is also well known a hybrid vehicle including an engine, a rotating machine functioning as a power source for running, a power transmission device, and an electric oil pump rotated by a motor dedicated to the electric oil pump to discharge oil. To promptly determine whether the electric oil pump operates normally in such a hybrid vehicle, it is conceivable that the test operation of the electric oil pump is performed after a power supply state of the hybrid vehicle is switched to a power-on state enabling the vehicle to run and before the hybrid vehicle actually starts running. If such a test operation of the electric oil pump is performed, an operation sound of the electric oil pump is easily heard, so that a driver may feel discomfort.

The present invention was conceived in view of the situations and it is therefore an object of the present invention to provide a control device of a hybrid vehicle capable of preventing a driver from feeling discomfort due to an operation sound of an electric oil pump when a test operation of the electric oil pump is performed.

Solution to Problem

To achieve the above object, a first aspect of the present invention provides a control device of a hybrid vehicle including (a) an engine, a rotating machine functioning as a power source for running, a power transmission device, and an electric oil pump rotated by a motor dedicated to the electric oil pump to discharge an oil, the control device comprising: (b) a state determining portion determining whether a measured temperature of the oil allows the electric oil pump to operate normally; (c) an electric oil pump control portion performing a test operation of the electric oil pump for determining whether the electric oil pump operates normally when it is determined that the measured temperature of the oil allows the electric oil pump to operate normally; and (d) an engine control portion controlling an operation of the engine, wherein (e) the electric oil pump control portion performs the test operation of the electric oil pump in a predetermined period after a power supply state of the hybrid vehicle is switched to a power-on state enabling the vehicle to run and before the hybrid vehicle actually starts running, and wherein (f) when the test operation of the electric oil pump is performed in the predetermined period, the engine control portion starts the engine.

A second aspect of the present invention provides the control device of the hybrid vehicle recited in the first aspect of the invention, wherein the state determining portion determines whether the measured temperature of the oil allows the electric oil pump to operate normally, based on whether the measured temperature of the oil is equal to or greater than a predetermined temperature and an elapsed time from switching of the power supply state of the hybrid vehicle to a power-off state disabling the vehicle from running is equal to or greater than a predetermined time.

A third aspect of the present invention provides the control device of the hybrid vehicle recited in the first or second aspect of the invention, wherein the electric oil pump control portion performs the test operation of the electric oil pump during running of the hybrid vehicle when it is determined that the measured temperature of the oil allows the electric oil pump to operate normally, and wherein the electric oil pump control portion performs the test operation of the electric oil pump in the predetermined period separately from during running of the hybrid vehicle.

Advantageous Effects of Invention

According to the control device recited in the first aspect of the invention, when the test operation of the electric oil pump is performed in the predetermined period after the power supply state of the hybrid vehicle is switched to the power-on state and before the hybrid vehicle actually starts running, the engine is started. Therefore, the operation sound of the electric oil pump generated due to performing the test operation can be made less noticeable by the operation sound of the engine. In other words, this provides a masking effect in which the operation sound of the electric oil pump during the test operation is hidden and made less noticeable by the operation sound of the engine. Therefore, when the test operation is performed, a driver can be prevented from feeling discomfort due to the operation sound of the electric oil pump.

According to the control device recited in the second aspect of the invention, it is determined whether the measured temperature of the oil allows the electric oil pump to operate normally, based on whether the measured temperature of the oil is equal to or greater than the predetermined temperature and the elapsed time from switching of the power supply state to the power-off state is equal to or greater than the predetermined time. Therefore, even if a temperature difference occurs between the measured temperature of the oil and a temperature of the oil affecting the operation of the electric oil pump, it is determined whether the measured temperature of the oil allows the electric oil pump to operate normally, based on the measured temperature of the oil while this temperature difference is slight, so that whether the electric oil pump operates normally can appropriately be determined.

According to the control device recited in the third aspect of the invention, the test operation of the electric oil pump is performed in the predetermined period separately from during running of the hybrid vehicle, and the engine is started when the test operation is performed, so that the determination as to whether the electric oil pump normally operates can promptly be performed while the operation sound of the electric oil pump is hardly noticeable.

An example of the present invention will now be described in detail with reference to the drawings.

EXAMPLE

Figure 1:
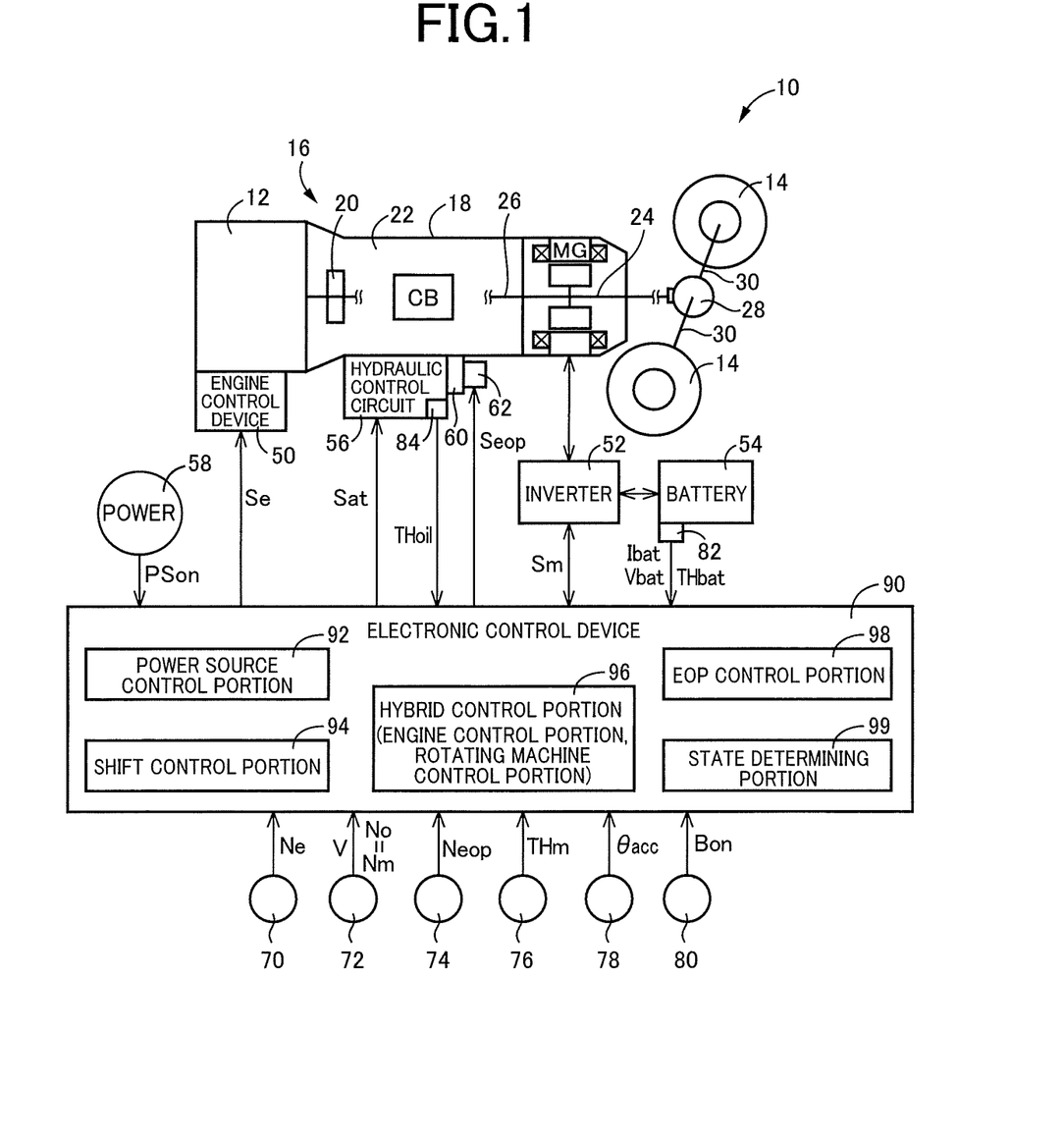
FIG. 1 is a diagram for explaining a general configuration of a vehicle to which the present invention is applied and for explaining main portions of a control function and a control system for various controls in the vehicle.

FIG. 1 is a diagram for explaining a general configuration of a vehicle 10 to which the present invention is applied and for explaining main portions of a control function and a control system for various controls in the vehicle 10. In FIG. 1, the vehicle 10 is a hybrid vehicle including an engine 12 and a rotating machine MG functioning as a power source for running configured to generate a drive torque. The vehicle 10 also includes drive wheels 14 and a power transmission device 16 disposed in a power transmission path between the engine 12 and the drive wheels 14. The power transmission device 16 transmits a power from the power source for running to the drive wheels 14. A torque and a force have the same meaning as the power if the power, torque and force are not particularly distinguished.

The engine 12 is a known internal combustion engine such as a gasoline engine and a diesel engine, for example. The engine 12 has an engine torque Te that is an output torque of the engine 12 controlled by an electronic control device 90 described later controlling an engine control device 50 such as a throttle actuator, a fuel injection device, and an ignition device included in the vehicle 10.

The rotating machine MG is a rotating electric machine having a function of an electric motor (motor) and a function of an electric generator (generator) and is a so-called motor generator. The rotating machine MG is connected to a battery 54 serving as an electric storage device disposed in the vehicle 10 via an inverter 52 disposed in the vehicle 10, and the electronic control device 90 controls the inverter 52 to control an MG torque Tm that is output torque of the rotating machine MG. The MG torque Tm is defined as a power running torque when the torque is a positive torque i.e., in the acceleration direction and is a regenerative torque when the torque is a negative torque i.e., in the deceleration direction. The battery 54 is an electric storage device giving and receiving an electric power to and from the rotating machine MG.

The power transmission device 16 includes an MOP 20, an automatic transmission 22, a rotor shaft 24, etc. in a casing 18 serving as a non-rotating member attached to a vehicle body. The MOP 20 is a mechanical oil pump coupled to the engine 12 and rotated by the engine 12 to discharge an oil OIL (see FIG. 2 described later). The automatic transmission 22 is coupled to the engine 12 via a torque converter not shown, for example. The rotor shaft 24 is integrally coupled to an output shaft 26 that is an output rotating member of the automatic transmission 22. The rotating machine MG disposed in the casing 18 is coupled to the rotor shaft 24 such that the rotating machine MG integrally rotates with the rotor shaft 24. The power transmission device 16 includes a differential gear device 28 coupled to the rotor shaft 24, a pair of axles 30 coupled to the differential gear device 28, etc. In the power transmission device 16, the power output from the engine 12 is transmitted to the automatic transmission 22 and is transmitted from the automatic transmission 22 via the rotor shaft 24, the differential gear device 28, etc. to the drive wheels 14. In the power transmission device 16, the power output from the rotating machine MG is transmitted via the rotor shaft 24, the differential gear device 28, etc. to the drive wheels 14.

The automatic transmission 22 is a known planetary gear type automatic transmission including a plurality of planetary gear devices and a plurality of engagement devices CB, for example. The automatic transmission 22 has any gear position formed out of a plurality of gear positions different in speed change ratio (=rotation speed of input rotating member/rotation speed of output rotating member) in accordance with engagement of any engagement devices included in the plurality of engagement devices CB. The engagement devices CB are hydraulic friction engagement devices made up of multiplate or single-plate type clutches and brakes pressed by hydraulic actuators, band brakes fastened by hydraulic actuators, etc. The plurality of engagement devices CB respectively have operation states, i.e., states such as engagement and release, switched in accordance with regulated oil pressures Pcb (see FIG. 2 described later) output from a hydraulic control circuit 56 included in the vehicle 10. In the automatic transmission 22, the gear position is switched by the electronic control device 90 in accordance with an accelerator operation of a driver (i.e. a person driving the vehicle), a vehicle speed V, etc.

The vehicle 10 further includes a power switch 58, an EOP 60, etc.

The power switch 58 is a vehicle power switch operated by the driver to switch a power supply state of the vehicle 10 between a power-on state enabling (allowing) the vehicle 10 to run and a power-off state disabling the vehicle 10 from running. The power switch 58 is, for example, a momentary type push button switch, and is subjected to a pushing operation by the driver to a switch-on position. Each time the power switch 58 is subjected to the pushing operation to the switch-on position, the power switch 58 outputs a power switch signal PSon corresponding to the switch-on position to the electronic control device 90. The electronic control device 90 detects the operation of the power switch 58 based on the power switch signal PSon. The operation of the power switch 58 is a power switch operation for switching the power supply state of the vehicle 10.

The EOP 60 is an electric oil pump rotated by a motor 62 dedicated to the EOP 60 included in the vehicle 10 to discharge the oil OIL (see FIG. 2 described later). The oil OIL discharged by the MOP 20 or EOP 60 is supplied to the hydraulic control circuit 56 (see FIG. 2). The oil pressures Pcb respectively supplied to the plurality of engagement devices CB are oil pressures regulated by the hydraulic control circuit 56 based on the oil OIL.

Figure 2:
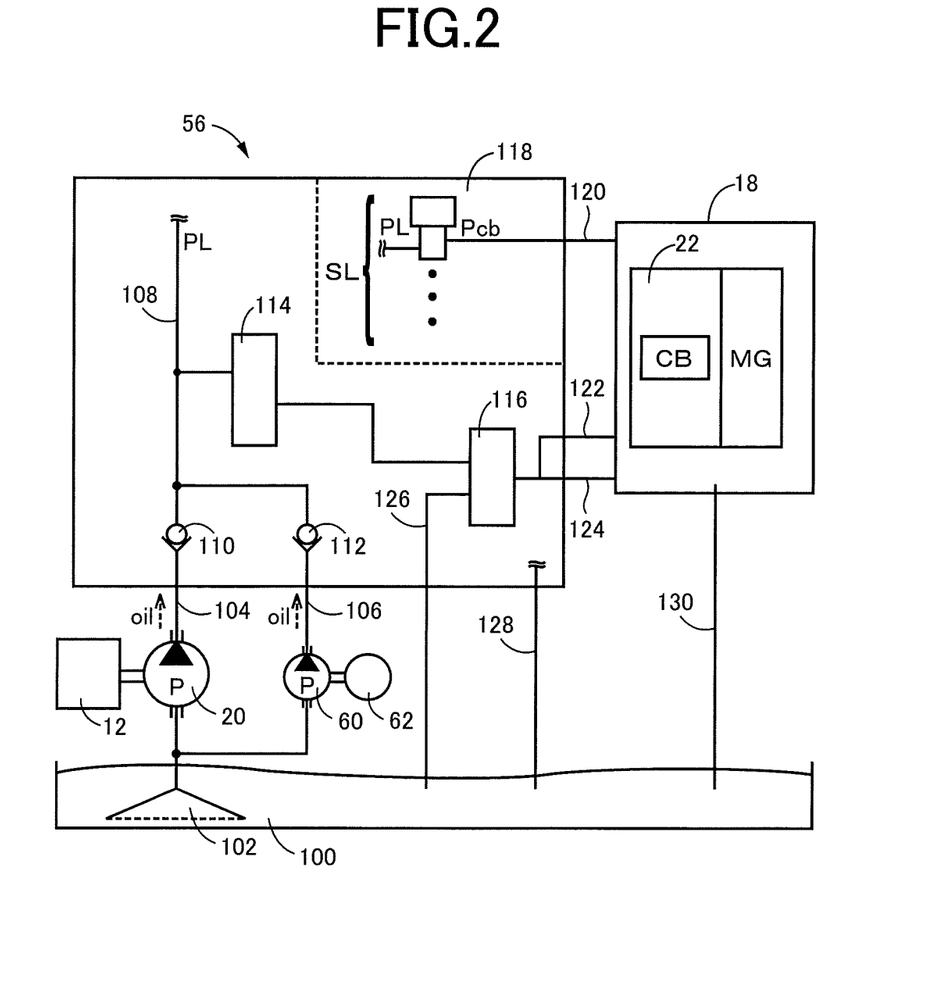
FIG. 2 is a diagram for explaining a hydraulic control circuit and is a diagram for explaining an oil pressure source supplying an oil to the hydraulic control circuit.

FIG. 2 is a diagram for explaining the hydraulic control circuit 56 and is a diagram for explaining an oil pressure source supplying the oil OIL to the hydraulic control circuit 56. In FIG. 2, the MOP 20 and the EOP 60 are disposed in parallel due to a configuration of oil passages through which the oil OIL flows. The MOP 20 and the EOP 60 each discharge the oil OIL used as a source of oil pressure for switching the operation state of each of the engagement devices CB, lubricating portions of the power transmission device 16, and cooling the rotating machine MG. The MOP 20 and the EOP 60 each suck up the oil OIL flowing back to an oil pan 100 disposed in a lower portion of the casing 18, through a strainer 102 that is a common suction port, and discharge the oil OIL to respective discharge oil passages 104, 106. The discharge oil passages 104, 106 are each coupled to an oil passage included in the hydraulic control circuit 56, for example, a line pressure oil passage 108 that is an oil passage through which a line pressure PL flows. The discharge oil passage 104 of the oil OIL discharged from the MOP 20 is coupled to the line pressure oil passage 108 via an MOP check valve 110 included in the hydraulic control circuit 56. The discharge oil passage 106 of the oil OIL discharged from the EOP 60 is coupled to the line pressure oil passage 108 via an EOP check valve 112 included in the hydraulic control circuit 56. The MOP 20 rotates together with the engine 12 to generate the oil OIL. The EOP 60 can generate the oil OIL regardless of the rotation state of the engine 12.

The hydraulic control circuit 56 includes a primary regulator valve 114, a secondary regulator valve 116, an AT oil pressure control system 118, a supply oil passage 120, a lubricating oil passage 122, a cooling oil passage 124, discharge oil passages 126, 128, 130, etc., in addition to the line pressure oil passage 108, the MOP check valve 110, and the EOP check valve 112 described above.

The primary regulator valve 114 regulates the line pressure PL using the oil OIL discharged by at least one of the MOP 20 and the EOP 60. For example, a linear solenoid valve not shown is controlled by the electronic control device 90 such that a pilot pressure corresponding to an input torque etc. to the automatic transmission 22 is output to the primary regulator valve 114, and the line pressure PL is thereby set to an oil pressure corresponding to the input torque etc. of the automatic transmission 22.

The secondary regulator valve 116 regulates an oil pressure for lubrication of portions of the power transmission device 16 and cooling of the rotating machine MG based on the oil OIL discharged from the primary regulator valve 114. The oil pressure for lubrication is supplied through the lubricating oil passage 122 to the portions of the power transmission device 16 including the automatic transmission 22. The oil pressure for cooling is supplied through the cooling oil passage 124 to the rotating machine MG.

The AT oil pressure control system 118 includes multiple solenoid valves SL. The multiple solenoid valves SL are respectively controlled by the electronic control device 90 to regulate the oil pressures Pcb supplied to the hydraulic actuators of the plurality of engagement devices CB by using the line pressure PL as a source pressure. The oil pressures Pcb are supplied through the supply oil passage 120 to the hydraulic actuators of the engagement devices CB. The AT oil pressure control system 118 controls the supply and discharge of the oil pressures Pcb via the multiple solenoid valves SL so as to control a shift operation of the automatic transmission 22.

The oil OIL discharged due to the operation of the secondary regulator valve 116, the oil OIL discharged due to the operation of the solenoid valves SL, the oil OIL supplied to the portions through the lubricating oil passage 122 and the cooling oil passage 124, etc. are returned through the discharge oil passages 126, 128, 130 to the oil pan 100.

Returning to FIG. 1, the vehicle 10 includes the electronic control device 90 as a controller including a control device of the vehicle 10 related to control of the engine 12, the automatic transmission 22, etc. FIG. 1 is a diagram showing an input/output system of the electronic control device 90 and is a functional block diagram for explaining a main portion of a control function of the electronic control device 90. The electronic control device 90 is configured to include a so-called microcomputer including a CPU, a RAM, a ROM, and an I/O interface, for example, and the CPU executes signal processes in accordance with a program stored in advance in the ROM, while utilizing a temporary storage function of the RAM, to provide various controls of the vehicle 10. The electronic control device 90 may be configured separately for the engine control, the shift control, etc., as needed.

The electronic control device 90 is supplied with various signals etc. (e.g., the power switch signal PSon that is a signal indicative of the power switch operation by the driver, an engine rotation speed Ne that is a rotation speed of the engine 12, an output rotation speed No that is a rotation speed of the output shaft 26 corresponding to the vehicle speed V, i.e., an MG rotation speed Nm that is a rotation speed of the rotating machine MG, an EOP rotation speed Neop that is a rotation speed of the EOP 60, an MG temperature THm that is a temperature of the rotating machine MG, an accelerator opening degree θacc defined as a driver's accelerating operation amount representative of a magnitude of a driver's accelerating operation, a brake signal Bon that is a signal indicative of a state in which a brake pedal for actuating a wheel brake is operated by the driver, a battery temperature THbat, a battery charge/discharge current Ibat, and a battery voltage Vbat of the battery 54, an oil temperature THoil that is a measured temperature of the oil OIL) based on detection values from various sensors etc. included in the vehicle 10 (e.g., the power switch 58, an engine rotation speed sensor 70, an MG rotation speed sensor 72, an EOP rotation speed sensor 74, an MG temperature sensor 76, an accelerator opening degree sensor 78, a brake switch 80, a battery sensor 82, and an oil temperature sensor 84). The electronic control device 90 calculates a state-of-charge value SOC [%] as an index indicative of a state of charge of the battery 54 based on the battery charge/discharge current Ibat and the battery voltage Vbat, for example.

The electronic control device 90 outputs to the devices included in the vehicle 10 (e.g., the engine control device 50, the inverter 52, the hydraulic control circuit 56, and the motor 62) various command signals (e.g., an engine control command signal Se for controlling the engine 12, a rotating machine control command signal Sm for controlling the rotating machine MG, an oil pressure control command signal Sat for controlling the operation states of the engagement devices CB, and an EOP control command signal Seop for controlling an operation of the EOP 60).

To implement various controls in the vehicle 10, the electronic control device 90 includes a power source control means, i.e., a power source control portion 92, a shift control means, i.e., a shift control portion 94, a hybrid control means, i.e., a hybrid control portion 96, and an electric oil pump control means, i.e., an electric oil pump control portion 98. The electric oil pump control portion 98 will hereinafter be referred to as an EOP control portion 98.

The power source control portion 92 switches the power supply state of the vehicle 10 based on the power switch operation by the driver, i.e., based on the power switch signal PSon. The power supply state of the vehicle 10 includes the power-on state and the power-off state, for example and can be switched therebetween. The power-on state is a power supply state enabling the vehicle 10 to run so that the vehicle 10 can start and run if an accelerator is turned on, for example. The power-off state is a power supply state disabling the vehicle from running. The power-off state may be any state in which the vehicle is disabled from running, obviously including such a state in which a security function is operating, for example, and is intended to also include a state in which electric power is supplied to audio equipment or a battery power outlet socket etc., and a state in which vehicle information etc. are displayed on a display in the interior of the vehicle. That is, even when the vehicle 10 is in a partially power-on state in which only a portion of functions of the vehicle 10 can be performed, this state is included in the power-off state if the vehicle is disabled from running.

When the power source control portion 92 detects an on-input of the power switch signal PSon while the brake signal Bon is turned on in the power-off state, the power supply control portion 92 switches the power supply state of the vehicle 10 to the power-on state. When the power supply control portion 92 detects an off-input of the power switch signal PSon in the power-on state during the vehicle 10 is stopped, the power supply control portion 92 switches the power supply state of the vehicle 10 to the power-off state.

The shift control portion 94 determines a shift of the automatic transmission 22 by using, for example, a shift map that is a predefined relationship and provides the shift control of the automatic transmission 22 as needed. In the shift control of the automatic transmission 22, the shift control portion 94 outputs to the hydraulic control circuit 56 the oil pressure control command signal Sat for switching the operation state of the engagement devices CB by the solenoid valves SL so as to automatically switch the gear position of the automatic transmission 22. The shift map has shift lines for determining the shift of the automatic transmission 22 on two-dimensional coordinates using the vehicle speed V and a required drive torque Trdem as variables, for example. In the shift map, the output rotation speed No etc. may be used instead of the vehicle speed V, or a required drive force Frdem, the accelerator opening degree θacc, etc. may be used instead of the required drive torque Trdem. The shift lines in the shift map are upshift lines for determining an upshift and downshift lines for determining a downshift.

The hybrid control portion 96 has a function of an engine control means, i.e., an engine control portion, controlling the operation of the engine 12, and a function of a rotating machine control means, i.e., a rotating machine control portion, controlling the operation of the rotating machine MG via the inverter 52, and provides a hybrid drive control etc. using the engine 12 and the rotating machine MG through these control functions.

The hybrid control portion 96 calculates the required drive torque Trdem [Nm] at the drive wheels 14 in terms of a drive request amount by applying the accelerator opening degree θacc and the vehicle speed V to, for example, a drive request amount map that is a predefined relationship. The required drive force Frdem [N] at the drive wheels 14, a required drive power Prdem [W] at the drive wheels 14, a required AT output torque at the output shaft 26, etc. can be used as the drive request amount, in addition to the required drive torque Trdem. The hybrid control portion 96 outputs the engine control command signal Se that is a command signal for controlling the engine 12 and the rotating machine control command signal Sm that is a command signal for controlling the rotating machine MG so as to achieve the required drive power Prdem, for example.

The hybrid control portion 96 selectively establishes a motor running mode or a hybrid running mode as a running mode depending on a running state to cause the vehicle 10 to run in each of the running modes. The motor running mode is a running mode enabling a motor running in which the rotating machine MG is used as the power source for the running while the operation of the engine 12 is stopped. The hybrid running mode is a running mode enabling a hybrid running in which at least the engine 12 is used as the power source for the running.

The hybrid control portion 96 establishes the motor running mode when the required drive power Prdem is in a motor running region smaller than a predefined threshold value, and establishes the hybrid running mode when the required drive power Prdem is in a hybrid running region equal to or greater than the predefined threshold value. Even when the required drive power Prdem is in the motor running region, the hybrid control portion 96 establishes the hybrid running mode if the state-of-charge value SOC of the battery 54 is less than a predefined engine start threshold value. The engine start threshold value is a predefined threshold value for determining that the state-of-charge value SOC reaches a level at which the engine 12 must forcibly be started for charging the battery 54. The required drive power Prdem is obtained by multiplying the vehicle speed V and the required drive torque Trdem.

In the motor running mode, the hybrid control portion 96 outputs to the engine control device 50 the engine control command signal Se for bringing the engine 12 into a stopped state, outputs to the shift control portion 94 a command for bringing the automatic transmission 22 into a state in which power transmission is disabled, i.e., into a neutral state, and outputs to the inverter 52 the rotating machine control command signal Sm for causing the rotating machine MG to output the MG torque Tm achieving the required drive torque Trdem. As a result, in the motor running mode, the MG torque Tm is transmitted as the drive torque of the vehicle 10 to the drive wheels 14.

In the hybrid running mode, the hybrid control portion 96 outputs to the engine control device 50 the engine control command signal Se for causing the engine 12 to output the engine torque Te achieving the required drive torque Trdem in consideration of the gear position of the automatic transmission 22 and outputs to the inverter 52 the rotating machine control command signal Sm for causing the rotating machine MG to idle without load. As a result, in the hybrid running mode, the engine torque Te is transmitted as the drive torque of the vehicle 10 to the drive wheels 14 via the automatic transmission 22 in which one of the gear positions is formed. Alternatively, in the hybrid running mode, the hybrid control portion 96 may output to the engine control device 50 the engine control command signal Se for causing the engine 12 to output the engine torque Te achieving a portion of the required drive torque Trdem and output to the inverter 52 the rotating machine control command signal Sm for causing the rotating machine MG to output the MG torque Tm achieving the remaining portion of the required drive torque Trdem. In this case, the MG torque Tm is transmitted to the drive wheels 14 as the drive torque of the vehicle 10 in addition to the drive torque from the engine torque Te.

When the engine 12 is stopped, for example, during the motor running mode, the EOP control portion 98 outputs to the motor 62 the EOP control command signal Seop for operating the EOP 60 so that the oil OIL is discharged at a required flow rate for ensuring various oil pressures. The EOP control portion 98 operates the EOP 60 on the condition that a condition A is satisfied, for example. For example, the condition A is that "the vehicle speed V is a predetermined vehicle speed V1 or higher and the MG temperature THm is a predetermined MG temperature THm1 or higher" and "(the oil temperature THoil is a predetermined temperature THo1 or higher and the oil temperature sensor 84 is normal) or (the oil temperature sensor 84 is abnormal)". The condition A is an operating condition of the EOP 60 predefined in consideration of the cooling of the rotating machine MG during running in the motor running mode and the difficulty of operating the EOP 60 at a low oil temperature at which the viscosity of the oil OIL is increased. The EOP 60 may be operated not only when the engine 12 is stopped. Therefore, the required flow rate of the oil OIL may be shared by two oil pumps, i.e., the MOP 20 and the EOP 60.

The EOP control portion 98 outputs the EOP control command signal Seop for operating the EOP 60 to the motor 62 so as to determine whether the EOP 60 operates normally, i.e., to perform a failure diagnosis of the EOP 60. Therefore, the EOP control portion 98 outputs the EOP control command signal Seop to the motor 62 so as to perform a test operation of the EOP 60 for performing the failure diagnosis of the EOP 60. The EOP control portion 98 performs the failure diagnosis of the EOP 60 based on whether the EOP 60 operates in accordance with the EOP control command signal Seop, for example, based on whether the EOP rotation speed Neop is within a rotation speed range corresponding to the EOP control command signal Seop.

The electronic control device 90 further includes a state determining means, i.e., a state determining portion 99, so as to implement a control function of performing the failure diagnosis of the EOP 60.

The state determining portion 99 determines whether the temperature THoil of the oil OIL is equal to or greater than a predetermined temperature THo2. The predetermined temperature THo2 is a lower limit temperature of a predefined temperature range allowing the EOP 60 to operate normally. The predetermined temperature THo2 is a lower limit temperature of a temperature range in which the EOP 60 can reliably be operated and is a temperature higher than the predetermined temperature THo1.

Figure 3:
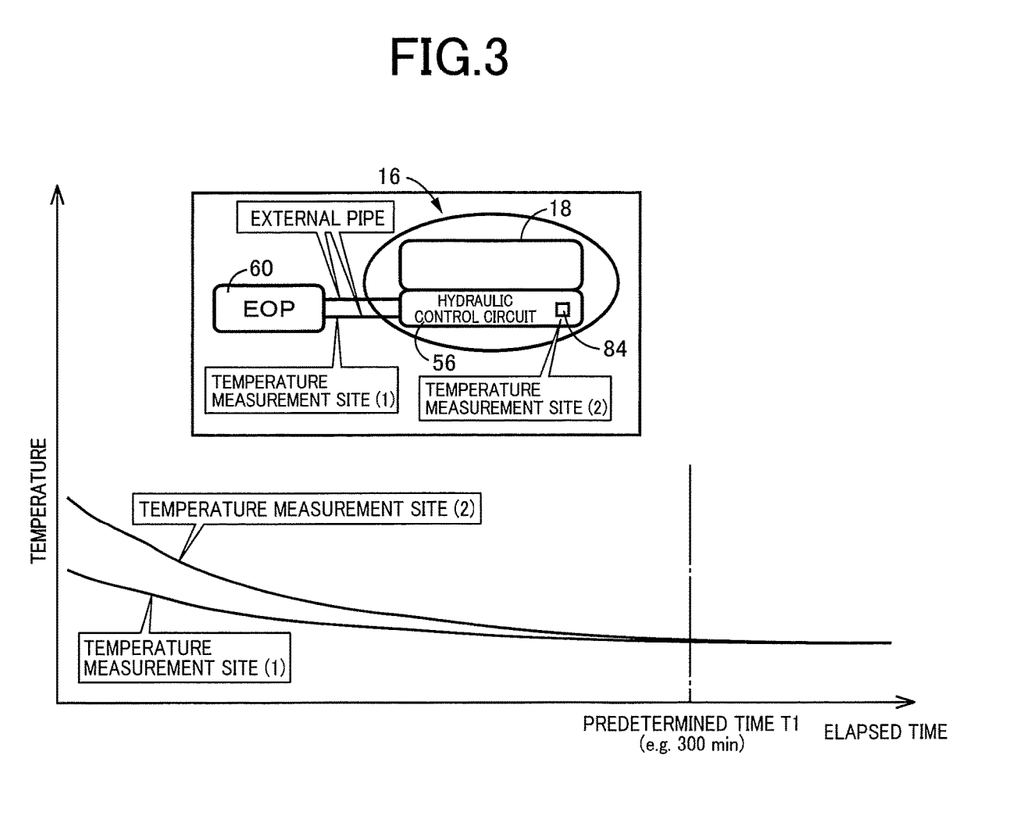
FIG. 3 is a diagram for explaining an example of a temperature difference of oil due to a difference of a temperature measurement site that is a position of measurement of temperature of the oil.

FIG. 3 is a diagram for explaining an example of a temperature difference of the oil OIL due to a difference of temperature measurement sites that are positions of measurement of the temperature of the oil OIL. As shown in FIG. 3, the oil temperature sensor 84 is disposed inside the hydraulic control circuit 56 included in the power transmission device 16, for example. As shown in FIG. 3, the EOP 60 is coupled to the hydraulic control circuit 56 via an external pipe due to the configuration of the oil passage of the oil OIL. When a temperature of the oil OIL in the external pipe at a temperature measurement site (1) changes, the pipe resistance received by the oil OIL discharged from the EOP 60 changes, and therefore, the temperature of the oil OIL in the external pipe affects the operation of the EOP 60. On the other hand, the oil temperature THoil in a temperature measurement site (2) may not accurately represent the temperature of the oil OIL affecting the operation of the EOP 60. For example, the temperature of the oil OIL in the external pipe is lower than the oil temperature THoil during running since the external pipe is cooled by a wind. In such a case, even if the measured temperature THoil of the oil OIL has a value assuring the operation of the EOP 60 in the failure diagnosis of the EOP 60, the EOP 60 does not operate normally, which makes it difficult to determine whether the EOP 60 actually has a failure. The external pipe is not cooled by a wind during stop of the vehicle 10. As shown in FIG. 3, when an elapsed time after power-off defined as an elapsed time from switching of the power supply state of the vehicle 10 to the power-off state is equal to or greater than a predetermined time T1, the temperature of the oil OIL in the external pipe and the oil temperature THoil becomes substantially constant with a slight difference between these temperatures. For example, the predetermined time T1 is a lower limit time defined in advance as a time required for the temperature of the oil OIL in the external pipe and the oil temperature THoil to be substantially constant with a slight difference between these temperatures.

The state determining portion 99 determines whether the measured temperature of the oil OIL allows the EOP 60 to operate normally, based on the oil temperature THoil while a temperature difference is slight between the oil temperature THoil and the temperature of the oil OIL affecting the operation of the EOP 60. Specifically, the state determining portion 99 determines whether the measured temperature of the oil OIL allows the EOP 60 to operate normally, depending on satisfaction of a condition B that the oil temperature THoil is equal to or greater than the predetermined temperature THo2 and that the elapsed time after power-off is equal to or greater than the predetermined time T1. The condition B may include, for example, that the oil temperature sensor 84 is normal and that the power supply state of the vehicle 10 has been switched to the power-on state.

The EOP control portion 98 performs the test operation of the EOP 60 for performing the failure diagnosis of the EOP 60 if the state determining portion 99 determines that the measured temperature of the oil OIL allows the EOP 60 to operate normally, i.e., on the condition that the condition B is determined as being satisfied.

When the test operation of the EOP 60 is performed for the failure diagnosis, the driver may feel discomfort if an operation sound of the EOP 60 is noticed. In this example, the operation sound of the EOP 60 is also referred to as an EOP operation sound. It is thought that a larger background noise in the vehicle interior makes the driver less likely to notice the EOP operation sound.

The EOP control portion 98 performs the test operation of the EOP 60 for performing the failure diagnosis of the EOP 60 when the background noise in the vehicle interior is relatively large, for example, during at least one of running of the vehicle 10 and operation of the engine 12, on the condition that the state determining portion 99 determines the condition B as being satisfied.

It is desirable that the failure diagnosis of the EOP 60 is performed as promptly as possible. The EOP control portion 98 performs the test operation of the EOP 60 for performing the failure diagnosis of the EOP 60 in a predetermined period P1 after the power supply state of the vehicle 10 is switched to the power-on state and before the vehicle 10 actually starts running, on the condition that the state determining portion 99 determines the condition B as being satisfied. Therefore, the EOP control portion 98 performs the test operation of the EOP 60 for performing the failure diagnosis of the EOP 60 in the predetermined period P1, separately from during at least one of running of the vehicle 10 and operation of the engine 12, on the condition that the state determining portion 99 determines the condition B as being satisfied.

During the predetermined period P1, the vehicle 10 is not running and is basically in the motor running mode, and therefore, the vehicle 10 is in a stopped state and the engine 12 is in the stopped state. If the test operation of the EOP 60 is performed in the predetermined period P1, the failure diagnosis of the EOP 60 can promptly be performed; however, the background noise in the vehicle interior is smaller as compared to during running or engine operation, so that the EOP operation sound may become more noticeable.

When the test operation of the EOP 60 for performing the failure diagnosis of the EOP 60 is performed in the predetermined period P1, the hybrid control portion 96 outputs the engine control command signal Se to the engine control device 50 so as to start the engine 12. For example, when the test operation of the EOP 60 is performed, the hybrid control portion 96 starts the engine 12 before the start of the test operation of the EOP 60 or simultaneously with the start of the test operation. In other words, the engine 12 may be started at a time point not later than the start time point of the test operation of the EOP 60.

Figure 4:
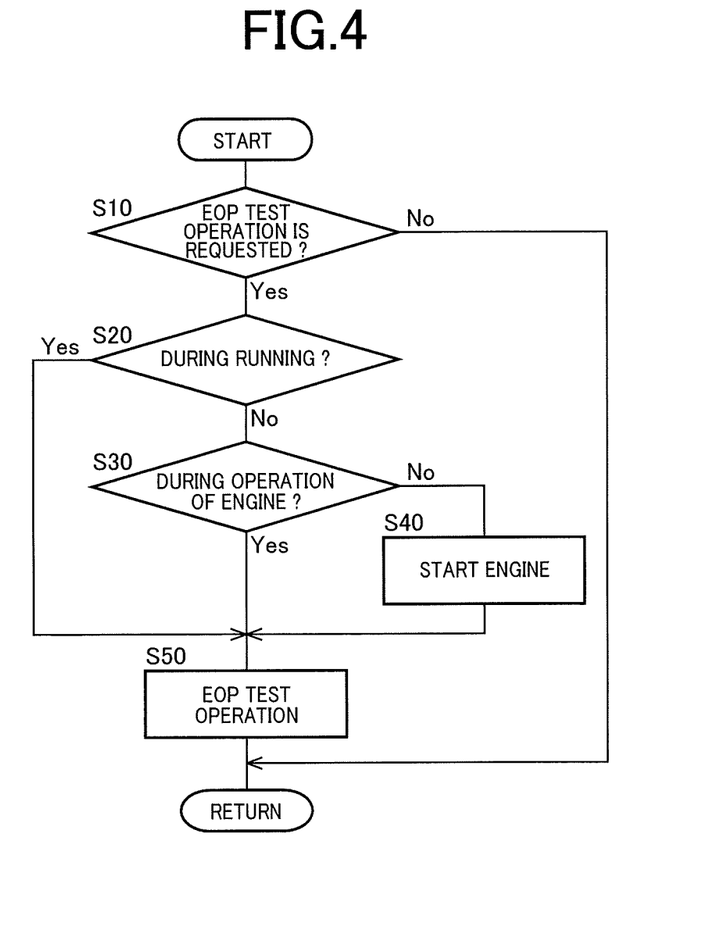
FIG. 4 is a flowchart for explaining a main portion of a control operation of an electronic control device, i.e., the control operation for preventing a driver from feeling discomfort due to an electric oil pump (EOP) operation sound when a test operation of the EOP is performed.
Figure 5:
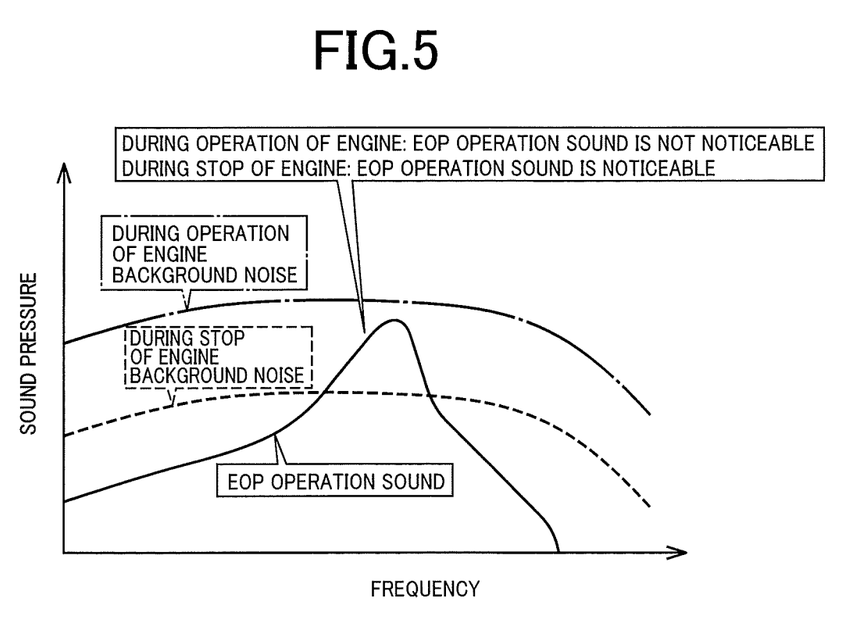
FIG. 5 is a diagram for explaining an example of an effect when the control operation shown in the flowchart of FIG. 4 is performed.

FIG. 4 is a flowchart for explaining a main portion of a control operation of the electronic control device 90, i.e., the control operation for preventing the driver from feeling discomfort due to the EOP operation sound when the test operation of the EOP 60 is performed, and is executed repeatedly, for example. FIG. 5 is a diagram for explaining an example of an effect when the control operation shown in the flowchart of FIG. 4 is performed.

In FIG. 4, at step (hereinafter, step is omitted) S10 corresponding to the function of the state determining portion 99, it is determined whether the test operation of the EOP 60 is requested, by determining whether the condition B is satisfied when the test operation of the EOP 60 for performing the failure diagnosis of the EOP 60 is required. The test operation of the EOP 60 is required, for example, when the failure diagnosis of the EOP 60 is not performed during one period from the power-on state to the power-off state. If the determination of S10 is negative, a routine of this flowchart is terminated. If the determination of S10 is affirmative, it is determined at S20 corresponding to the function of the state determining portion 99 whether the vehicle 10 is running based on the vehicle speed V, for example. If the determination of S20 is negative, it is determined at S30 corresponding to the function of the state determining portion 99 whether the engine 12 is operating based on the engine rotation speed Ne, for example. If the determination of S30 is negative, the engine 12 is started at S40 corresponding to the function of the hybrid control portion 96. If the determination of S20 is affirmative, or if the determination of S30 is affirmative, or after S40, the test operation of the EOP 60 for performing the failure diagnosis of the EOP 60 is performed at S50 corresponding to the function of the EOP control portion 98. In other words, it is determined at S20 and S30 whether it is in the predetermined period P1.

FIG. 5 shows an example when the test operation of the EOP 60 is performed in the predetermined period P1. In FIG. 5, the background noise in the vehicle interior is larger in the entire frequency range when the engine 12 is operating than when the engine 12 is stopped. If the test operation of the EOP 60 is performed while the engine 12 is kept stopped, the EOP operation sound is easily noticeable; however, if the test operation of the EOP 60 is performed while the engine 12 is operating, the EOP operation sound is hardly noticeable.

As described above, according to this example, when the test operation of the EOP 60 for performing the failure diagnosis of the EOP 60 is performed in the predetermined period P1 after the power supply state of the vehicle 10 is switched to the power-on state and before the vehicle 10 actually starts running, the engine 12 is started, and therefore, the EOP operation sound generated due to performing the test operation of the EOP 60 can be made less noticeable by an operation sound of the engine 12. In other words, this provides a masking effect in which the EOP operation sound during the test operation of the EOP 60 is hidden and made less noticeable by the operation sound of the engine 12. Therefore, when the test operation of the FOP 60 is performed, the driver can be prevented from feeling discomfort due to the EOP operation sound.

According to this example, it is determined whether the measured temperature of the oil OIL allows the EOP 60 to operate normally, based on whether the oil temperature THoil measured by the oil temperature sensor 84 is equal to or greater than the predetermined temperature THo2 and the elapsed time after power-off is equal to or greater than the predetermined time Tl. Therefore, even if a temperature difference occurs between the oil temperature THoil and the temperature of the oil OIL affecting the operation of the EOP 60, it is determined whether the measured temperature of the oil OIL allows the EOP 60 to operate normally, based on the oil temperature THoil while this temperature difference is slight, so that whether the EOP 60 operates normally can appropriately be determined.

According to this example, the test operation of the EOP 60 is performed in the predetermined period P1 separately from during running of the vehicle 10, and the engine 12 is started when the test operation is performed, so that the failure diagnosis of the FOP 60 can promptly be performed while the EOP operation sound is hardly noticeable.

Although the example of the present invention has been described in detail with reference to the drawings, the present invention is also applicable in other forms.

For example, the present invention has been described by exemplifying the parallel hybrid vehicle including the engine 12 and the rotating machine MG coupled to the drive wheels 14 in a power transmittable manner in the example described above; however, the present invention is not limited to this form. For example, the vehicle 10 may have the rotating machine MG coupled to a power transmission path between the engine 12 and the automatic transmission 22, and the power of the rotating machine MG may be transmitted via the automatic transmission 22 to the drive wheels 14. In this case, a clutch separating the engine 12 from the power transmission path is preferably disposed. Alternatively, the present invention is also applicable to a type of hybrid vehicle including an engine, an electric continuously variable transmission having a power dividing mechanism to which the engine is coupled, and a rotating machine coupled to drive wheels in a power transmittable manner. Alternatively, the present invention is also applicable to a series hybrid vehicle including an engine, a rotating machine for power generation generating electricity from the power of the engine, and a rotating machine for driving driven by electric power generated by the rotating machine and/or electric power of a battery. In such a series hybrid vehicle, an engine may be disposed such that an engine torque is not mechanically transmitted to the drive wheels. Therefore, in the series hybrid vehicle, the engine may not mechanically be coupled to the drive wheels in a power transmittable manner and may not be a power source for running. If the engine is not a power source for running, a transmission such as the automatic transmission 22 is not necessarily required. In the case of a vehicle without a transmission, the oil is used for cooling the rotating machine, for example. Alternatively, in a vehicle including a transmission such as the automatic transmission 22, for example, the oil is used in a power transmission device when cooling of the rotating machine is unnecessary. In short, the present invention is applicable to any hybrid vehicle including an engine, a rotating machine functioning as a power source for running, a power transmission device, and an electric oil pump rotated by a motor dedicated to the electric oil pump to discharge an oil.

In the example described above, if the test operation of the EOP 60 for performing the failure diagnosis of the EOP 60 is not necessarily performed during running of the vehicle 10, S20 in the flowchart of FIG. 4 is not necessarily required.

In the example described above, the oil temperature sensor 84 is disposed inside the hydraulic control circuit 56; however, the present invention is not limited to this form. For example, the oil temperature sensor 84 may be disposed in the oil pan 100 or the external pipe.

The above description is merely an embodiment and the present invention can be implemented in variously modified and improved forms based on the knowledge of those skilled in the art.

REFERENCE SIGNS LIST

10: vehicle (hybrid vehicle)
12: engine
16: power transmission device
60: EOP (electric oil pump)
62: motor (motor dedicated to an electric oil pump)
90: electronic control device (control device)
96: hybrid control portion (engine control portion)
98: EOP control portion (electric oil pump control portion)
99: state determining portion
MG: rotating machine

What is claimed is:

1. A control device of a hybrid vehicle including an engine, a rotating machine functioning as a power source for running, a power transmission device, and an electric oil pump rotated by a motor dedicated to the electric oil pump to discharge an oil, the control device comprising:
processing circuitry configured to:
determine whether a measured temperature of the oil allows the electric oil pump to operate normally;
perform a test operation of the electric oil pump for determining whether the electric oil pump operates normally when it is determined that the measured temperature of the oil allows the electric oil pump to operate normally; and
control an operation of the engine,
wherein the processing circuitry is further configured to perform the test operation of the electric oil pump in a predetermined period after a power supply state of the hybrid vehicle is switched to a power-on state enabling the vehicle to run and before the hybrid vehicle actually starts running, and
wherein, when the test operation of the electric oil pump is performed in the predetermined period, the processing circuitry is configured to start the engine.

2. The control device of the hybrid vehicle according to claim 1, wherein the processing circuitry is further configured to:
determine whether the measured temperature of the oil allows the electric oil pump to operate normally, based on whether the measured temperature of the oil is equal to or greater than a predetermined temperature and an elapsed time from switching of the power supply state of the hybrid vehicle to a power-off state disabling the vehicle from running is equal to or greater than a predetermined time.

3. The control device of the hybrid vehicle according to claim 2, wherein the processing circuitry is further configured to:
perform the test operation of the electric oil pump during running of the hybrid vehicle when it is determined that the measured temperature of the oil allows the electric oil pump to operate normally, and
perform the test operation of the electric oil pump in the predetermined period separately from during running of the hybrid vehicle.

4. The control device of the hybrid vehicle according to claim 1, wherein the processing circuitry is further configured to:
perform the test operation of the electric oil pump during running of the hybrid vehicle when it is determined that the measured temperature of the oil allows the electric oil pump to operate normally, and
perform the test operation of the electric oil pump in the predetermined period separately from during running of the hybrid vehicle.

* * * * *